United States Patent
Crow, Jr.

(10) Patent No.: US 11,827,135 B1
(45) Date of Patent: Nov. 28, 2023

(54) SYSTEM FOR TRANSPORTATION OF FOOD IN A VEHICLE

(71) Applicant: Robert Elvin Crow, Jr., Roswell, NM (US)

(72) Inventor: Robert Elvin Crow, Jr., Roswell, NM (US)

( * ) Notice: Subject to any disclaimer, the term of this patent is extended or adjusted under 35 U.S.C. 154(b) by 93 days.

(21) Appl. No.: 17/464,548

(22) Filed: Sep. 1, 2021

Related U.S. Application Data

(60) Provisional application No. 63/183,457, filed on May 3, 2021.

(51) Int. Cl.
| | | |
|---|---|---|
| *B60N 3/10* | (2006.01) | |
| *B62D 33/02* | (2006.01) | |
| *B62D 25/20* | (2006.01) | |

(52) U.S. Cl.
CPC ............. *B60N 3/101* (2013.01); *B62D 25/20* (2013.01); *B62D 33/02* (2013.01)

(58) Field of Classification Search
CPC .......... B60N 3/10; B60N 3/101; B60N 3/102; B60R 3/044; B60R 7/02; B60R 7/085; B60R 2011/029; B60R 2011/0036; B60R 2011/004; B60R 13/01; B60R 13/011; B60R 13/013; B60R 13/0815; B60R 13/0268; B62D 25/20; B62D 33/02
See application file for complete search history.

(56) References Cited

U.S. PATENT DOCUMENTS

| | | | |
|---|---|---|---|
| 6,254,162 B1 * | 7/2001 | Faber | B60R 5/04 224/539 |
| 6,673,409 B1 * | 1/2004 | Wheatley | B60R 11/00 428/137 |
| 6,719,348 B1 * | 4/2004 | Song | B60R 13/011 296/37.16 |
| 6,752,304 B1 * | 6/2004 | Hotary | B60N 2/3093 224/544 |
| 6,971,827 B1 * | 12/2005 | Embach | B60R 5/04 410/97 |
| 7,290,820 B1 * | 11/2007 | Smith | B60R 13/011 296/37.6 |
| 10,518,712 B1 * | 12/2019 | Dyle Kim | B60N 3/007 |
| 10,899,287 B1 * | 1/2021 | Conley | B32B 5/18 |
| 2002/0171022 A1 * | 11/2002 | Hsu | B60R 7/02 248/505 |
| 2004/0164587 A1 * | 8/2004 | Pickard | B60R 13/01 296/136.07 |
| 2005/0189387 A1 * | 9/2005 | Fatigati | B60R 7/02 224/497 |
| 2006/0038423 A1 * | 2/2006 | Nilsrud | B60R 7/02 296/37.5 |
| 2006/0121250 A1 * | 6/2006 | Wheatley | B60R 11/02 428/40.1 |

(Continued)

*Primary Examiner* — Gregory A Blankenship
(74) *Attorney, Agent, or Firm* — Plager Schack LLP; Mark H. Plager; Naomi Mann

(57) ABSTRACT

A system for transporting food within a vehicle comprises providing a recessed cavity within the floor of the vehicle and placing a food container within the recessed cavity. In certain embodiments, the recessed cavity may be provided within the trunk or flatbed of the vehicle and may include a heat-resistant and/or non-slip lining. In some further embodiments, the recess may include a cover having a top surface matching that of the vehicle floor, that may situate within the recessed cavity when not in use.

6 Claims, 8 Drawing Sheets

(56) References Cited

U.S. PATENT DOCUMENTS

| | | | |
|---|---|---|---|
| 2008/0061576 A1* | 3/2008 | Hwang | B60R 7/02 296/37.5 |
| 2009/0173759 A1* | 7/2009 | Edwards | B60R 11/06 224/42.12 |
| 2010/0230571 A1* | 9/2010 | Sharkey | B60N 3/101 248/311.2 |
| 2016/0059790 A1* | 3/2016 | Perelli | B60R 7/04 224/486 |
| 2016/0107584 A1* | 4/2016 | Coyle | B60N 3/103 224/403 |
| 2017/0050579 A1* | 2/2017 | Ranka | B60R 11/06 |
| 2018/0208129 A1* | 7/2018 | Mejia Barajas | B25H 5/00 |
| 2019/0071022 A1* | 3/2019 | Barradas Guarneros | B60R 5/04 |
| 2019/0283655 A1* | 9/2019 | Salter | B60P 7/14 |
| 2019/0291649 A1* | 9/2019 | Ito | B60R 7/02 |
| 2021/0188180 A1* | 6/2021 | Reyes Marcial | B60R 7/02 |
| 2022/0097611 A1* | 3/2022 | Clifford | B60R 5/04 |
| 2022/0126755 A1* | 4/2022 | Kraus | B60R 7/02 |
| 2022/0126929 A1* | 4/2022 | Phillips | B60N 3/001 |
| 2022/0144352 A1* | 5/2022 | Nelson | A47B 3/10 |
| 2022/0185192 A1* | 6/2022 | Gill | B60R 7/02 |
| 2022/0194300 A1* | 6/2022 | Ritter | B60R 13/013 |
| 2022/0234520 A1* | 7/2022 | Jayakumar | B32B 3/12 |
| 2022/0266756 A1* | 8/2022 | Harmon | B60R 5/04 |

\* cited by examiner

SYSTEM FOR TRANSPORTATION OF FOOD IN A VEHICLE

RELATED APPLICATION

This application claims benefit to provisional patent application U.S. Ser. No. 63/183,457 filed on May 3, 2021, which is incorporated herein by this reference.

BACKGROUND

The embodiments herein relate generally to systems for transportation of food in a vehicle.

Food transported in a vehicle may slide around and/or spill as it is jostled by the motion of the vehicle. Additionally, a heated food container may in some cases, damage the surface lining of the vehicle.

As such, there is a need for an improved system for securely transporting food in a vehicle, that addresses the above-mentioned problems of the prior art.

SUMMARY

According to various embodiments, disclosed is a system for transporting food within a vehicle, which may comprise providing a recessed cavity within the floor of the vehicle and placing a food container within the recessed cavity. In certain embodiments, the recessed cavity may be provided within the floor of the trunk of a car vehicle or flatbed of a truck vehicle. The recessed cavity may comprise a heat-resistant and/or non-slip lining which prevents the food container from slipping/tumbling, and may further hold a heated food container without damage to the lining.

In some embodiments, a cover may be provided for placement inside the recessed cavity when not in use, wherein the cover may be removed to reveal the recessed cavity. The cover may have a leveled top surface, which matches that of the vehicle floor, such that it is camouflaged within the vehicle floor. For example, the cover may be topped with a carpeted or upholstery surface, or may be painted to match the vehicle floor surface. In some further embodiments, the cover may be hinged proximate the recessed cavity, or may be provided with an attachment element for attaching the cover to a section of the vehicle when removed from the cavity.

In certain embodiments of the invention, provided is a method for transport of food in a vehicle, comprising: providing a recessed cavity within a floor section of the vehicle; and placing a food container within the recessed cavity, wherein the recessed cavity has a bottom lining made of a slip resistant material, wherein the slip resistant material prevents the food container from slipping during transport. In some embodiments, the recessed cavity includes a cover, the cover being configured to situate within the recessed cavity and to be removed from the recessed cavity, wherein a top surface of the cover is lined with a material matching a lining material of said floor section, and wherein the cover aligns with the floor section to provide a leveled floor when the cover is situated within said recessed cavity. In some embodiments, the method may further comprise removing the cover from the recessed cavity prior to placing the food container within the cavity. In further embodiments, the cover includes an attachment mechanism configured to attach the cover to a section of the vehicle outside the recessed cavity. In some further embodiments, the cover is hingedly proximate the recessed cavity. In some embodiments, the recessed cavity is provided in the floor section of the vehicle trunk or flatbed of a truck vehicle. In certain embodiments, the material of the bottom lining of the recessed cavity is also heat resistant.

In certain embodiments of the invention, provided is a method for transport of food in a vehicle, comprising: placing a cover having a slip and heat resistant top surface over a floor section of the vehicle, the cover further comprising a bottom surface including an anchor element which prevents the cover from slipping with respect to said floor section of the vehicle; and placing a food container on the slip and heat resistant surface, wherein the slip resistant material prevents the food container from tumbling during transport.

In certain embodiments of the invention, provided is a cover configured to provide a heat and slip resistant surface within a vehicle, for the transport of food. In embodiments, the cover may comprise a slip and heat resistant top surface, and a bottom surface including an anchor element configured to prevent the cover from slipping with respect to the floor section of the vehicle. In some embodiments, the anchor element may comprise pointed steel pegs.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
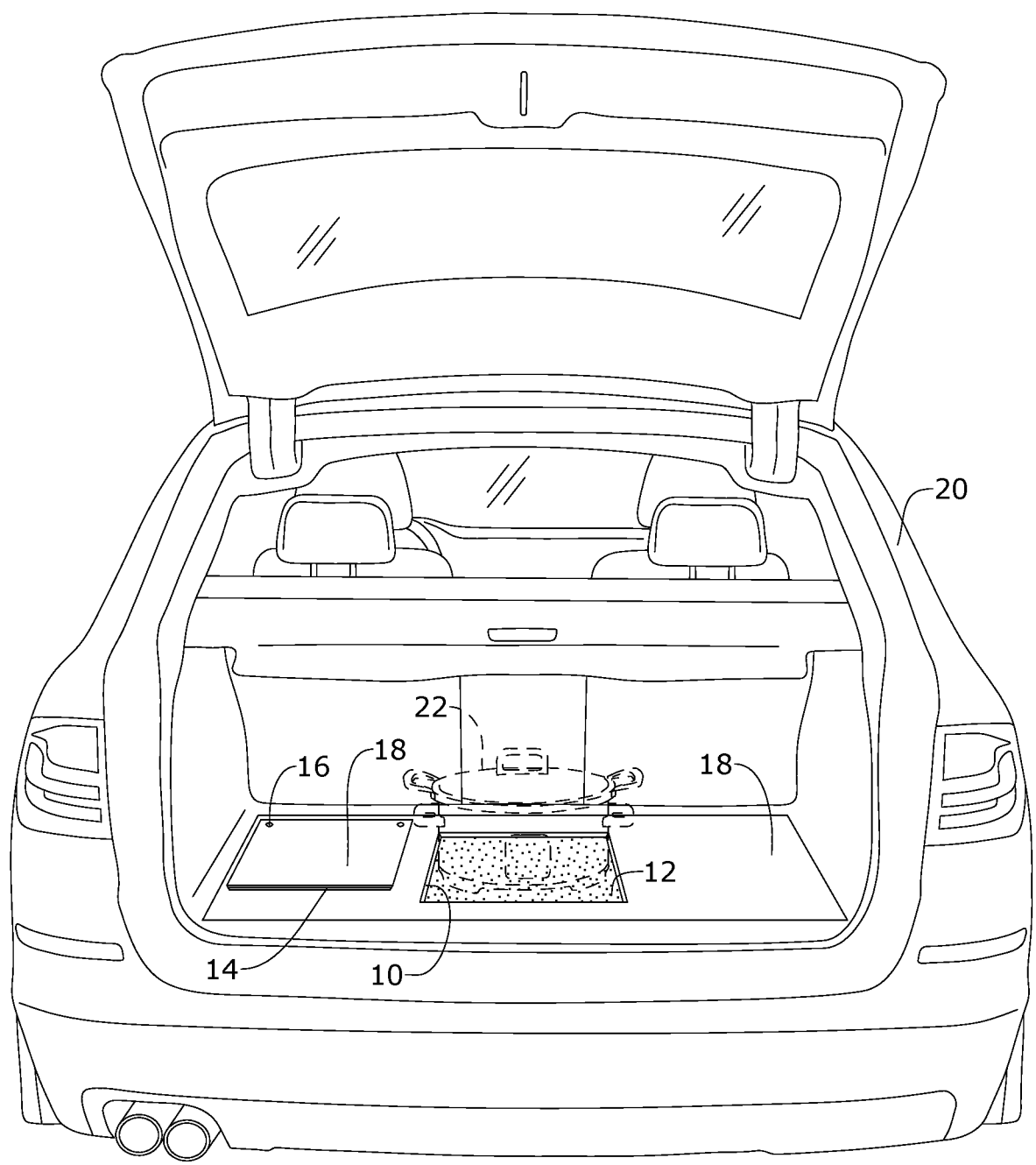
FIG. 1 shows a food transport system installed in a trunk of a car vehicle, the food transport system including a recessed cavity and a cover, according to various embodiments.
Figure 2:
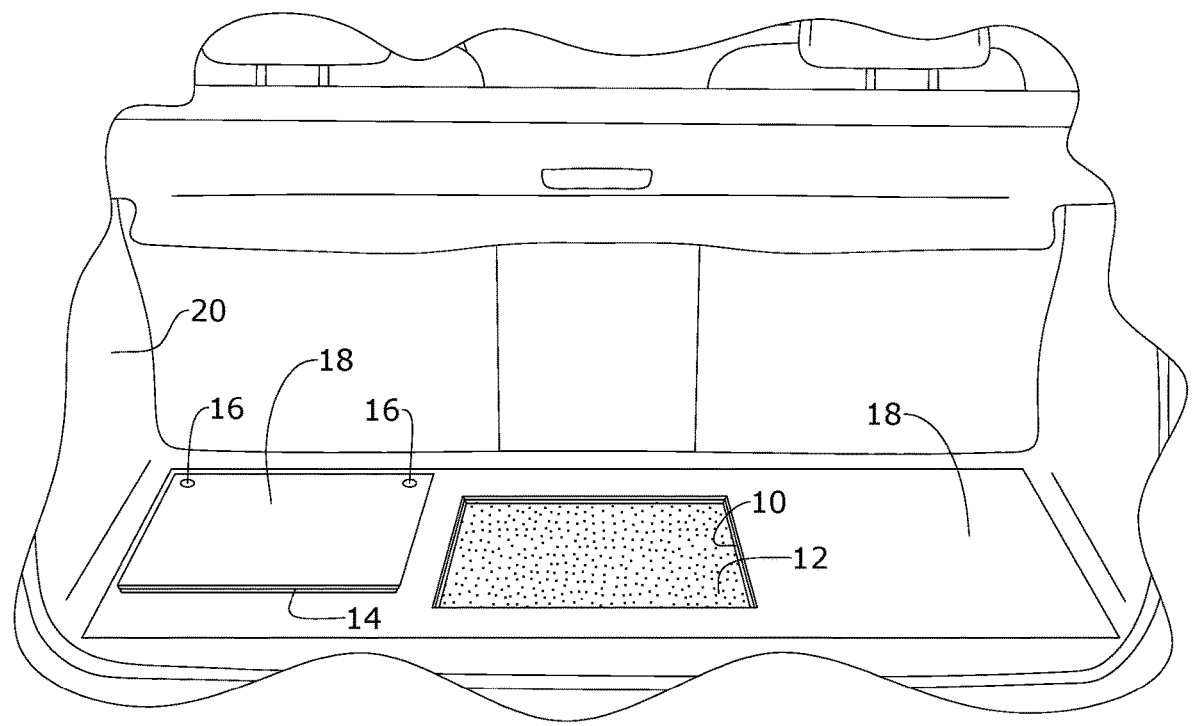
FIG. 2 is an enlarged perspective view of the food transport system depicted in FIG. 1, and showing the cover in an uninstalled state.
Figure 3:
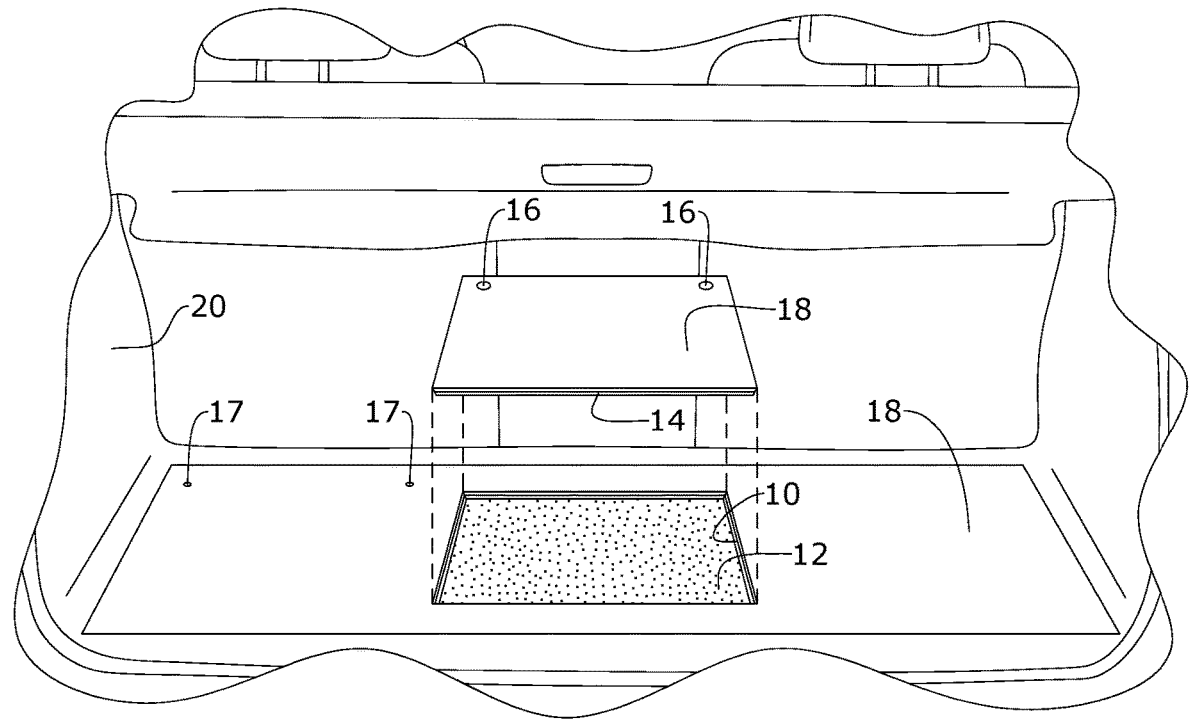
FIG. 3 is an enlarged perspective view of the food transport system depicted in FIG. 1, detailing alignment of the cover for installation over the recessed cavity.
Figure 4:
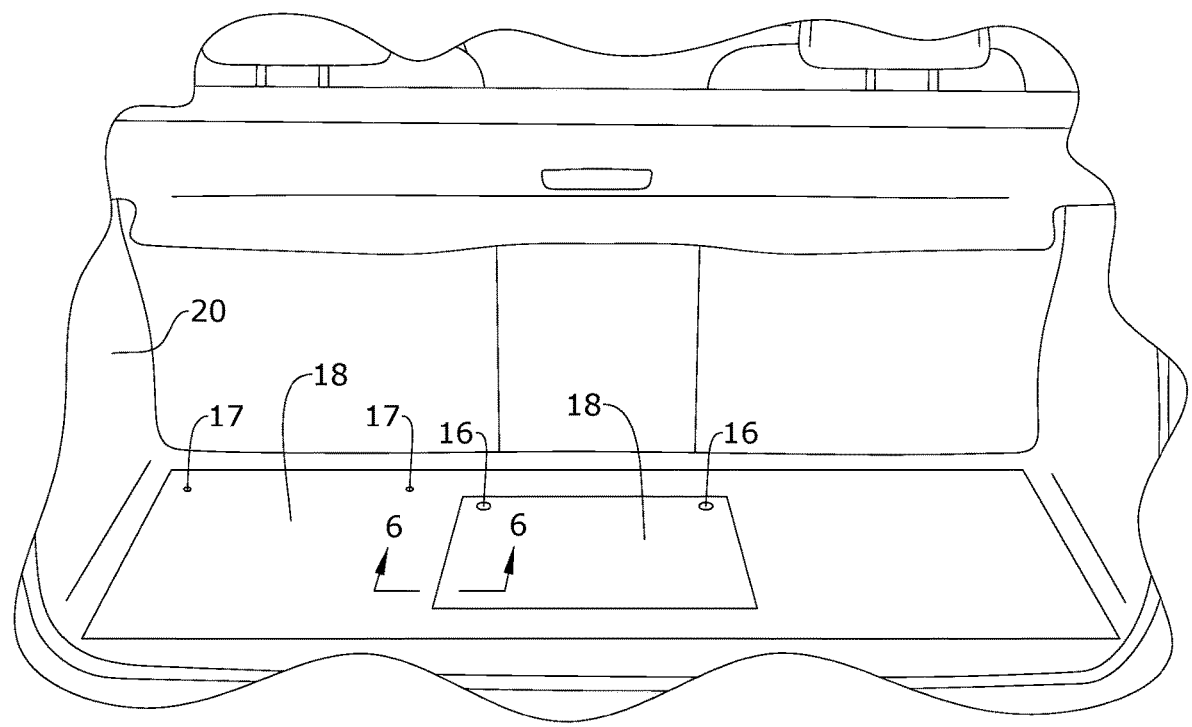
FIG. 4 is an enlarged perspective view of the food transport system depicted in FIG. 1, showing the cover in an installed state.
Figure 5:
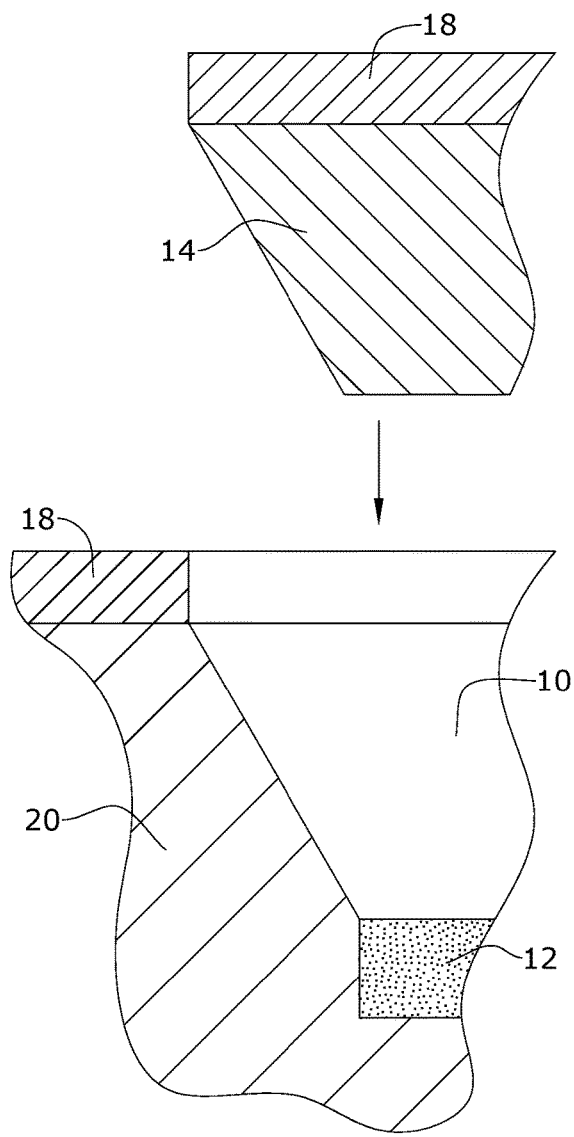
FIG. 5 is a sectional view taken along line 6-6 of FIG. 4, depicting a process for installation of the cover.
Figure 6:
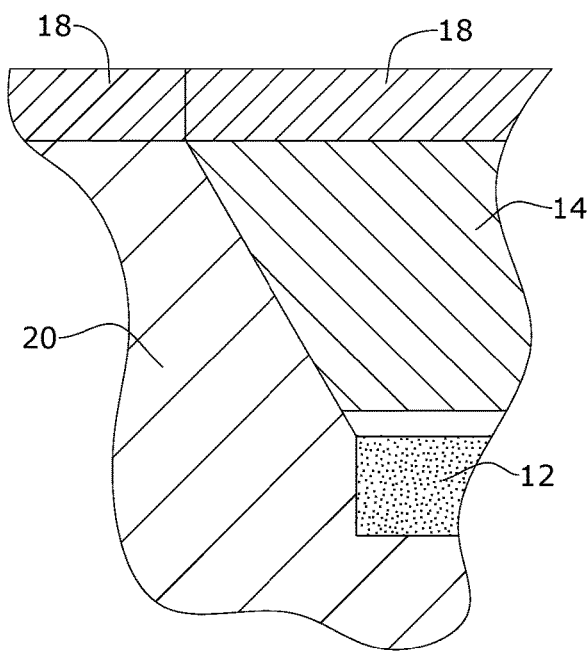
FIG. 6 is a sectional view taken along line 6-6 of FIG. 4, depicting the cover in an installed state.

In certain embodiments as depicted in FIGS. 1-8, a system for transport of food in a food container 22 via a vehicle 20 may comprise providing a recessed cavity 10 within the vehicle floor, i.e. floor board of the vehicle, which may be lined with a non-slip and/or heat resistant lining. In certain embodiments, recessed cavity 10 may be located in the vehicle floor of the trunk or truck bed of vehicle 20. It shall be understood that in alternate embodiments, recessed cavity 10 may be provided at a different location, such as a passenger seating area within the floor of vehicle 20. Vehicle 20 may be for example, a van, car, truck, SUV, wagon vehicle, and the like. It shall be appreciated that the disclosed system may be used for non-land vehicles, such as boats, aircraft, and the like.

Food container 22 may be a pot, pan, crockpot, and the like. In certain embodiments, food container may contain hot and/or liquid food, such as a stew, soup, and the like. Cavity 10 is configured to prevent food container 22 from sliding and/or tipping due to the jostling motion of the vehicle, thereby preventing the food from spilling out of container 22. Additionally, cavity 10 may prevent damage to the upholstery and/or plastic material that may line certain vehicles, and may be susceptible to damage from heat.

In embodiments, recessed cavity 10 may be a depression carved within the vehicle floor, which may have a depth less than the thickness of the vehicle floor. This may be for example, a depression of between about ¼ of an inch to about 3 inches, depending on the thickness of the vehicle floor. According to an exemplary embodiment, recessed cavity 10 may be sized to retain a standard large or medium sized food container and may be rectangular, as shown in the figures. This geometric configuration may be advantageous in preventing an oval container from laterally twisting within cavity 10. In one embodiment, recessed cavity 10 may have a length of between about 1.5 feet to about 8 inches, and a width of about 1.2 feet to about 5 inches. However, it should be appreciated that the size and geometric configurations of recessed cavity 10 may vary in alternate embodiments. Additionally, in some further embodiments, a wedge element (not shown) may be placed between food container 22 and the side walls of recessed cavity 10, to tighten the fit and provide added securement of the food container within the cavity. The wedge component may be, for example a towel or other compressible object, according to various embodiments.

In embodiments, recessed cavity 10 may be provided with a lining material 12 (cavity lining 12), which is heat and slip resistant. In certain embodiments, cavity lining 12 may cover at least a portion of the bottom surface of recessed cavity 10, and may be made of a material different from the lining 18 of the vehicle floor. In some embodiments, cavity lining 12 may be made from a material which is slip resistant, heat resistant, and easy to clean. For example, cavity lining 12 may be made of a silicone material, which has both high friction and heat resistance, to prevent food container 22 from sliding, and/or burning the cavity lining. Thus, cavity lining 12 and/or its side walls may work in concert to prevent food container 22 from spilling during transport, while providing a surface which is easy to clean in the event that food does spill. This is particularly advantageous in maintaining the cleanliness of vehicles which are upholstered (e.g. with textile, carpet, and the like), and for transport of liquid or spillable food.

In certain embodiments, recessed cavity 10 may include a cover 14. Cover 14 may be configured to snuggly fit within cavity 10, and to provide a leveled vehicle floor when the recessed cavity is not being used. In certain embodiments, cover 14 and recessed cavity 10 may have corresponding tapered side walls, such that the cover fits securely within the recessed cavity, with minimal gaps between the cover and vehicle floor, as particularly depicted in FIGS. 5 and 6. Additionally, the top surface of cover 14 may be provided with a lining 18, which matches the material of lining 18 of the vehicle floor. Thus, cover 14 integrates with the vehicle floor, to provide a unitary and leveled vehicle floor surface, when placed over recessed cavity 10. According to an exemplary embodiment, cover 14 may be made of a plastic or metal material, which is lined with an upholstery matching that of the vehicle floor; or which is painted at its top surface and/or provided with a rhino lining to match the truck bed. In some further embodiments, the top surface of cover 14 may include a strap or handle (not shown) to facilitate a user in lifting it from cavity 10.

According to one embodiment as shown in FIGS. 1-6, cover 14 may be entirely removable from cavity 10. Additionally, an attachment mechanism may be provided to attach the cover to the vehicle floor and allow it to be stowed, i.e. in the trunk or truck bed, when removed from the recessed cavity. The attachment mechanism may include, for example, a peg or male clip component 16, which fits within a hollow or female clip component 17, provided within the vehicle floor outside the recessed cavity. In some other embodiments, an attachment element, such as retaining clips may be located at a side wall of the vehicle. As such, the cover may be kept out of the way, and prevented from sliding around during transport.

Figure 7:
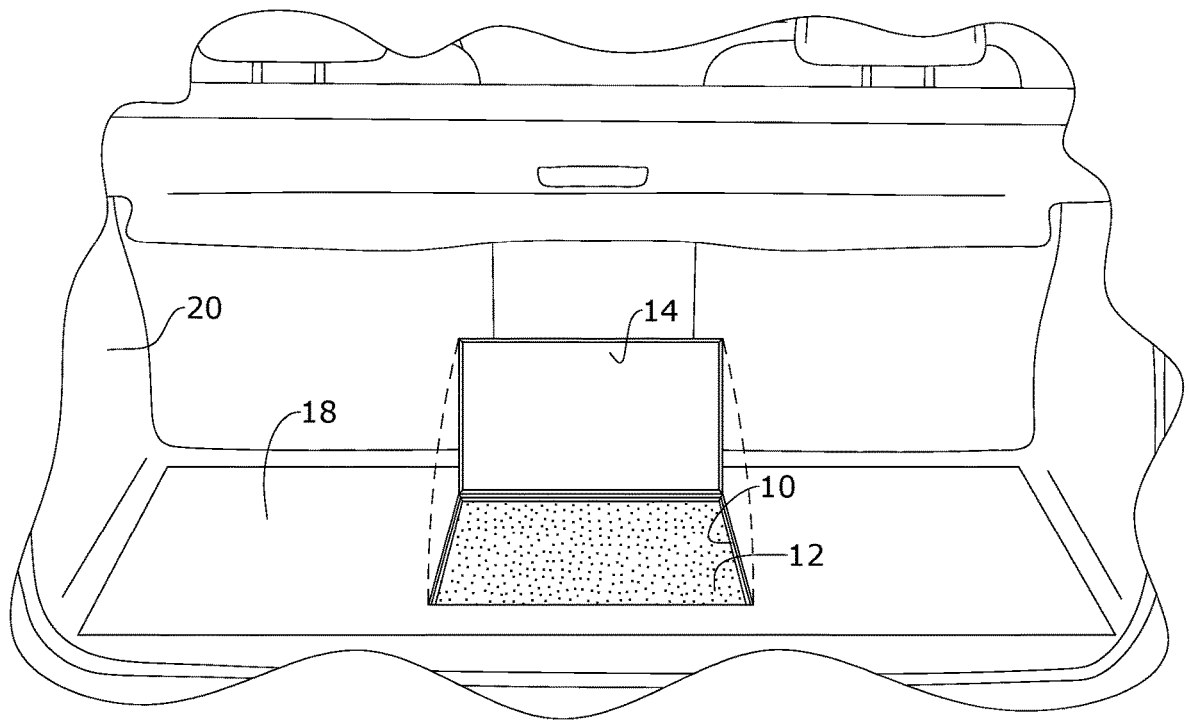
FIG. 7 depicts an alternate embodiment of the cover, in an opened position.
Figure 8:
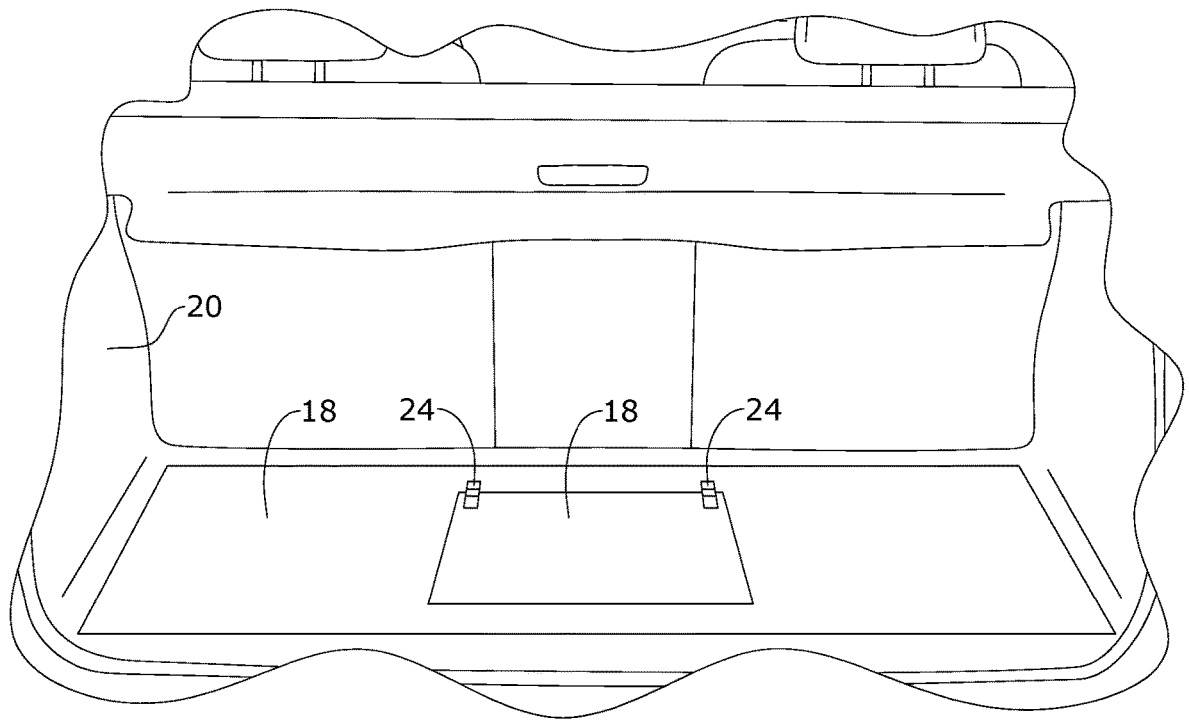
FIG. 8 depicts the cover of FIG. 7 in a closed position.

According to a second embodiment, as depicted in FIGS. 7 and 8, cover 14 may be hinged proximate recessed cavity 10, via a hinge attachment element 24. As such, cover 14 may remain attached to recessed cavity 10 during use, and prevented from slipping/tumbling during transport.

In operation, a user may lift cover 14 to reveal recessed cavity 10, and place a food container 22, such as a crock pot, pan, pot, etc., within recessed cavity 10. In some embodiments, the food container may be held in place, and prevented from shifting around due to the slip resistant lining 12 of the recessed cavity. In certain embodiments, the side walls of recessed cavity 10 may further prevent food 22 from shifting during transport. In some further embodiments, a wedge component, such as a towel, may be placed between the food container and side walls of the recessed cavity to further secure the container. As such, the food container may be transported, without spilling and creating a mess in the vehicle and/or ruining the food. During transport, the cover may be attached to the floor of the vehicle via an attachment mechanism, or may remain hinged to the recessed cavity and lifted out of the way.

Figure 9:
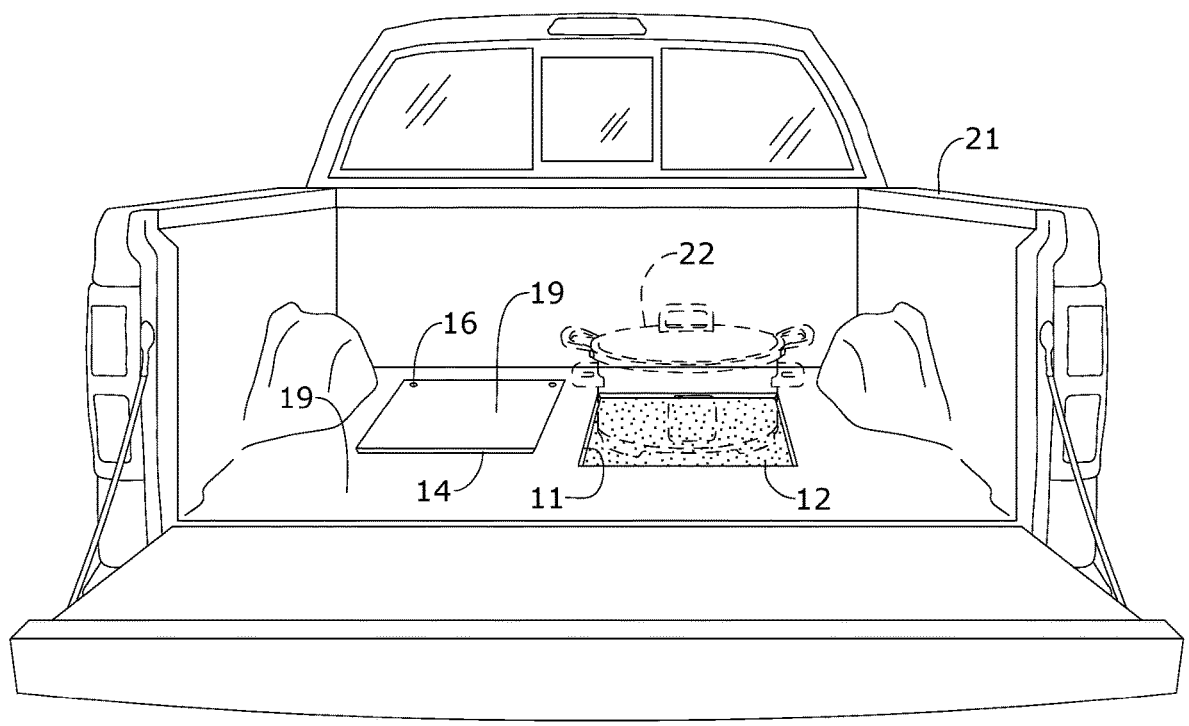
FIG. 9 shows the food transport system installed in a bed of a truck vehicle, according to an alternate embodiment of the invention.
Figure 10:
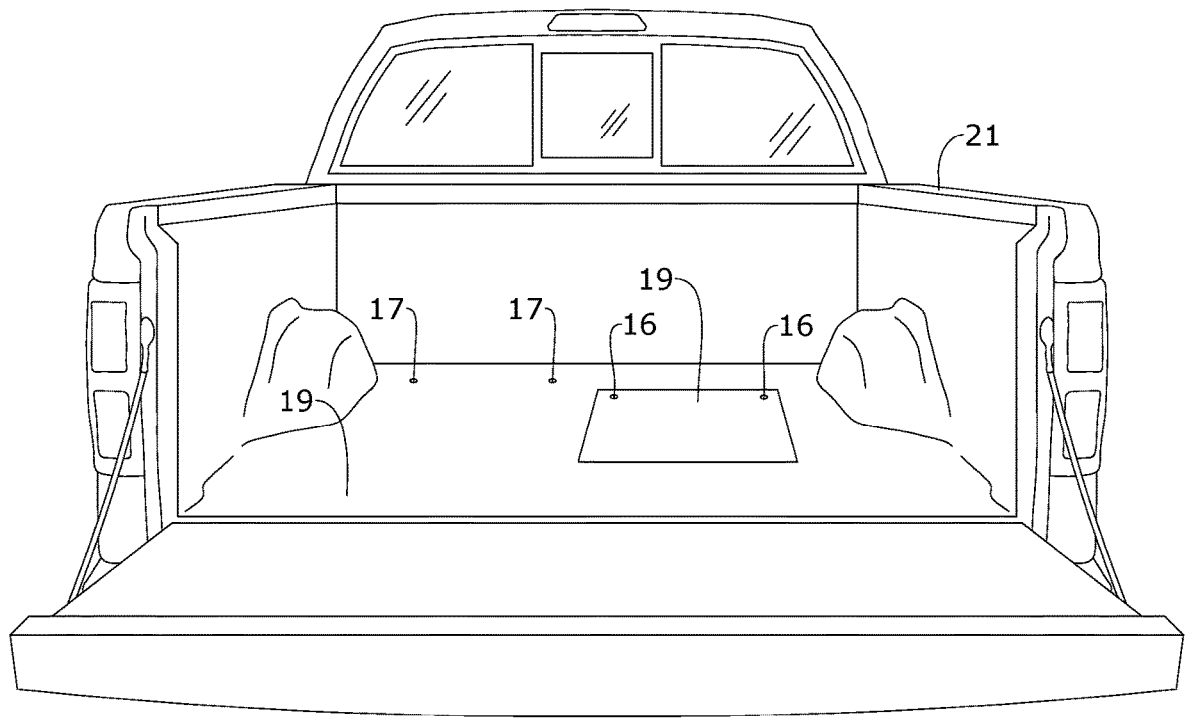
FIG. 10 shows the food transport system depicted in FIG. 9, with the cover depicted in a closed position.
Figure 11:
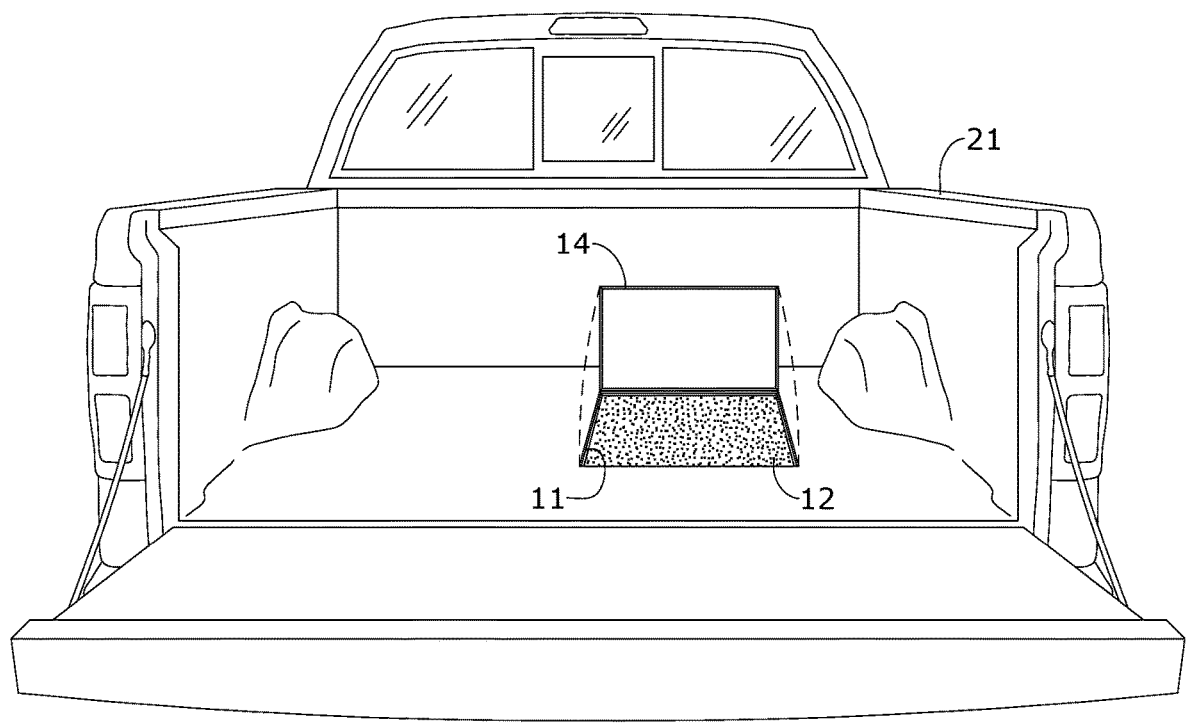
FIG. 11 shows the food transport system of FIG. 9, depicting an alternate embodiment for the cover which is shown in an opened position.
Figure 12:
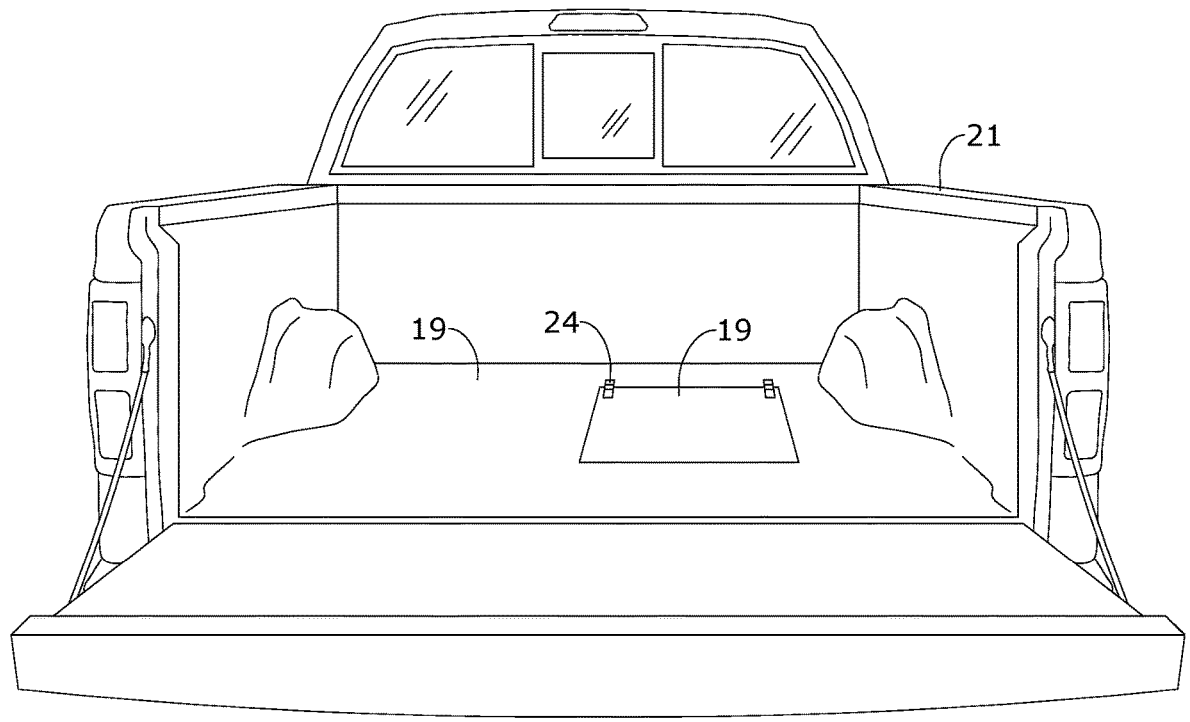
FIG. 12 shows the food transport system and cover depicted in FIG. 11, wherein the cover is shown in a closed position.

FIGS. 9-12 show an alternate embodiment of a recessed cavity 11 which is specifically configured for a truck vehicle 21. In embodiments, recessed cavity 11 ("truck bed recessed cavity 11") is similar to recessed cavity 10, and may be provided within the truck bed 19 of truck vehicle 21. In embodiments, truck bed recessed cavity 11 may comprise cavity lining 12, which covers at least a portion of the bottom surface of recessed cavity 11, and may be made of a material different from the material of truck bed 19. In embodiments, truck bed recessed cavity 11 may be provided with cover 14. Cover 14 may include a top surface, which is of the same material as the material of truck bed 19. As such, cover 14 may integrate with truck bed 19 to provide a unitary and leveled truck bed surface when placed over recessed cavity 11. In one embodiment, as depicted in FIGS. 9-10, cover 14 for track bed recessed cavity 11 may comprise male clip component(s) 16, which are configured to insert into female clip component(s) 17, within truck bed 19. This provides an attachment mechanism which allows cover 14 to be stowed in truck bed 19 when removed from truck bed recessed cavity 11. In an alternate embodiment, as depicted in FIGS. 11-12 cover 14 may be hinged proximate recessed cavity 11 via hinge attachment element 24.

Figure 13:
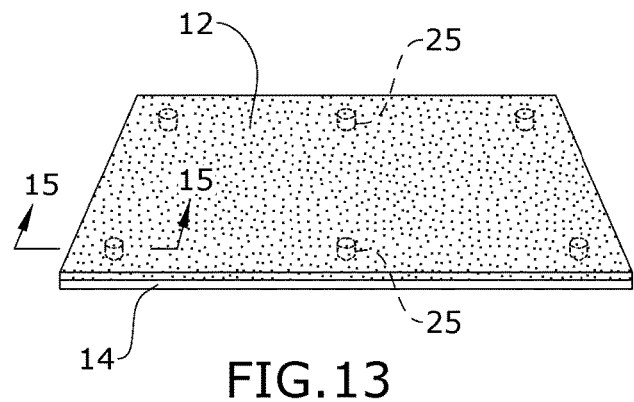
FIG. 13 is a top perspective view of a stand alone unit for a food transport system, according to an alternate embodiment of the invention.
Figure 14:
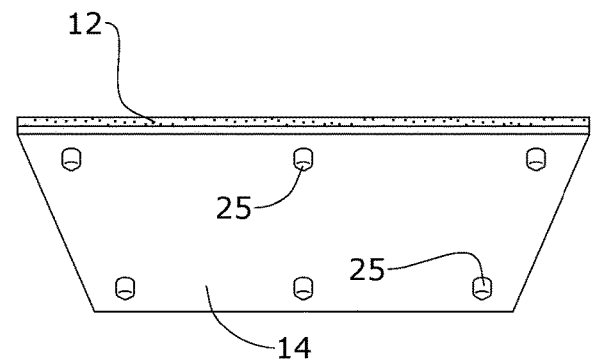
FIG. 14 is a bottom perspective view of the stand alone unit of FIG. 13.
Figure 15:
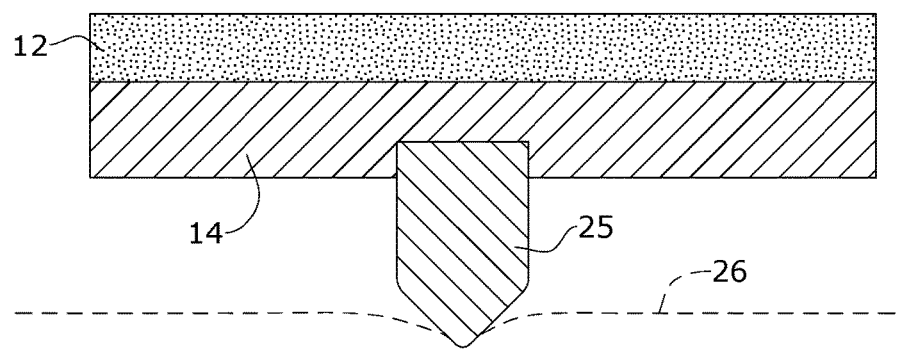
FIG. 15 is a sectional view taken along line 15-15 in FIG. 13.

According to an alternate embodiment as depicted in FIGS. 13-15, cover 14 may itself be used as a stand alone unit, to provide a high friction and heat resistant surface within vehicle 20, for transport of food container 22. In embodiments, cover 14 configured as a stand alone unit, may comprise a top surface lined with lining material 12, which is heat and slip resistant to prevent food container 22 from slipping and/or burning the lining of the vehicle floor. Cover 14 may further comprise anchors 25 configured to prevent cover 14 from moving around the vehicle floor during transport. In embodiments, the vehicle floor may be a carpeted or upholstered surface 26 of the trunk or other area of the vehicle. In one embodiment, anchors 25 may comprise stainless steel pegs with pointed ends configured to snag into surface 26. In some embodiments, the vehicle floor may be provided with recessed cavities into which anchors 25 may insert. In embodiments, cover 14, configured as a stand alone unit may be approximately 14 inches by approximately 18 inches.

The disclosed system may be useful in transporting a food, and particularly liquid and/or spillable food, to a friend's home, party, family function, or other event or location without spilling the food, and/or creating a mess in the vehicle.

In embodiments, the disclosed invention may be produced by carving out a sunken cavity in the trunk floor, truck bed, or other floor location of an existing vehicle and placing a slip and/or heat resistant lining within the cavity. In some alternate embodiments, a vehicle may be manufactured with a recessed cavity, as described herein. In some further embodiments, a floor panel that includes a recessed cavity and cover, as described herein, may be placed over an existing vehicle floor as an overlay.

As such, the disclosed subject matter provides a convenient and secure system for transporting food within a vehicle and prevents the food from spilling out and/or damaging the vehicle surface. It shall be appreciated that the size, shape and location of the recessed cavity disclosed herein can vary according to alternate embodiments. It shall be appreciated that the components of the invention described in several embodiments herein may comprise any alternative known materials in the field and be of any color, design, size and/or dimensions. It shall be appreciated that the components of the invention described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for transport of food in a vehicle, comprising:
   placing a food container within a recessed cavity provided in a floor section of the vehicle,
   wherein the recessed cavity has a bottom lining made of a slip resistant material, wherein the slip resistant material prevents the food container from tumbling during transport,
   wherein the recessed cavity includes a cover, the cover being configured to situate within the recessed cavity and to be removed from the recessed cavity, wherein a top surface of the cover is lined with a material matching a lining material of said floor section of the vehicle,
   wherein the cover aligns with the floor section to provide a leveled floor when the cover is situated within said recessed cavity, and
   wherein the cover includes an attachment mechanism configured to attach the cover to a section of the vehicle outside the recessed cavity.

2. The method of claim 1, further comprising removing the cover from the recessed cavity prior to placing the food container within the cavity.

3. The method of claim 1, wherein the cover is hingedly coupled proximate the recessed cavity.

4. The method of claim 1, wherein the recessed cavity is provided in the floor section of the vehicle trunk or flatbed.

5. The method of claim 1, wherein the material of the bottom lining of the recessed cavity is further heat resistant.

6. The method of claim 1, further comprising providing a recessed cavity within the floor section of the vehicle.

* * * * *